Aug. 23, 1960  E. E. SHUBE  2,949,891
PNEUMATICALLY ACTUATED MECHANICAL JACKS
Filed Aug. 16, 1956  3 Sheets-Sheet 1
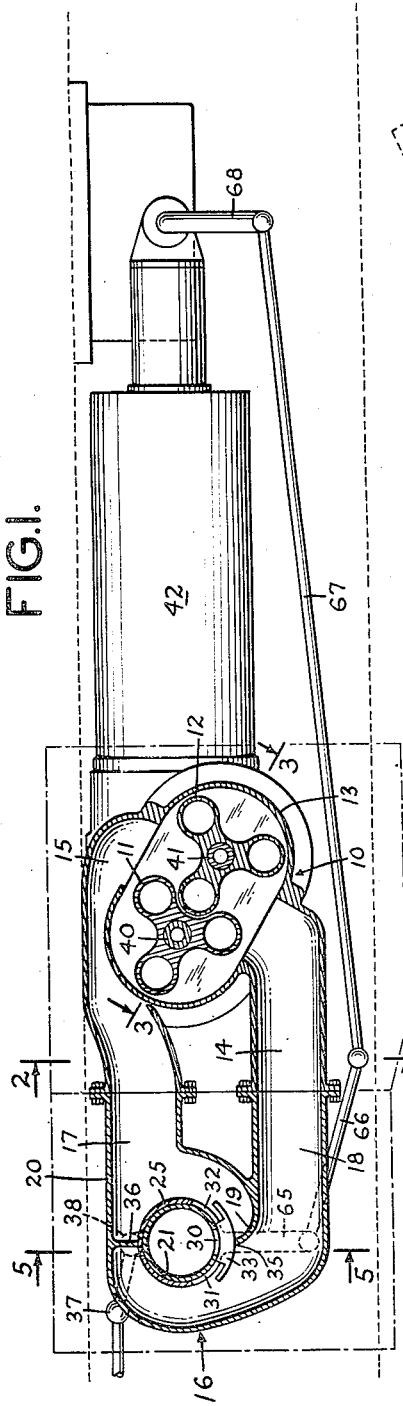
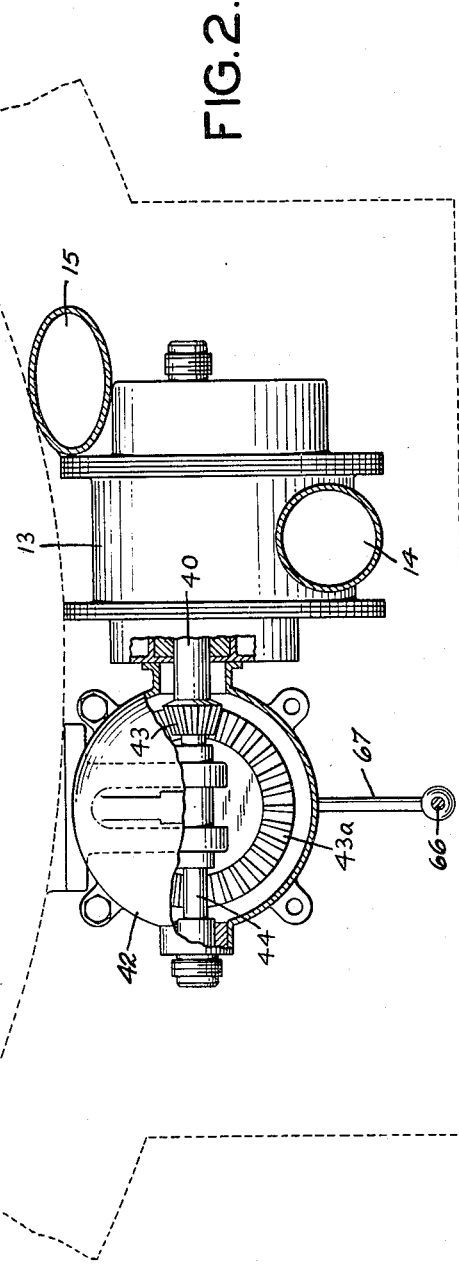
INVENTOR
EUGENE ELLIOT SHUBE
BY
HIS ATTORNEYS Aug. 23, 1960    E. E. SHUBE    2,949,891
PNEUMATICALLY ACTUATED MECHANICAL JACKS
Filed Aug. 16, 1956    3 Sheets-Sheet 2
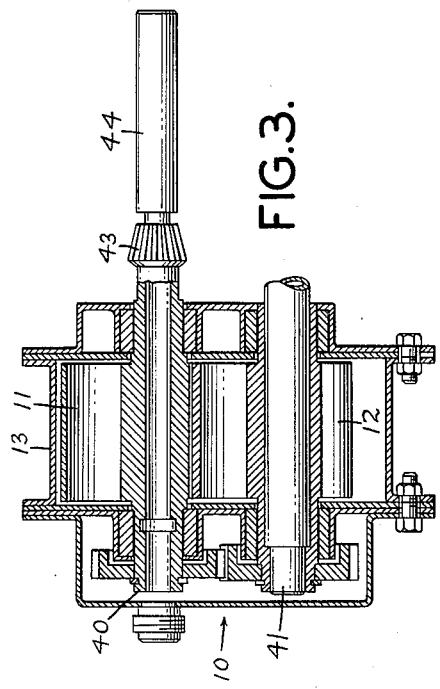
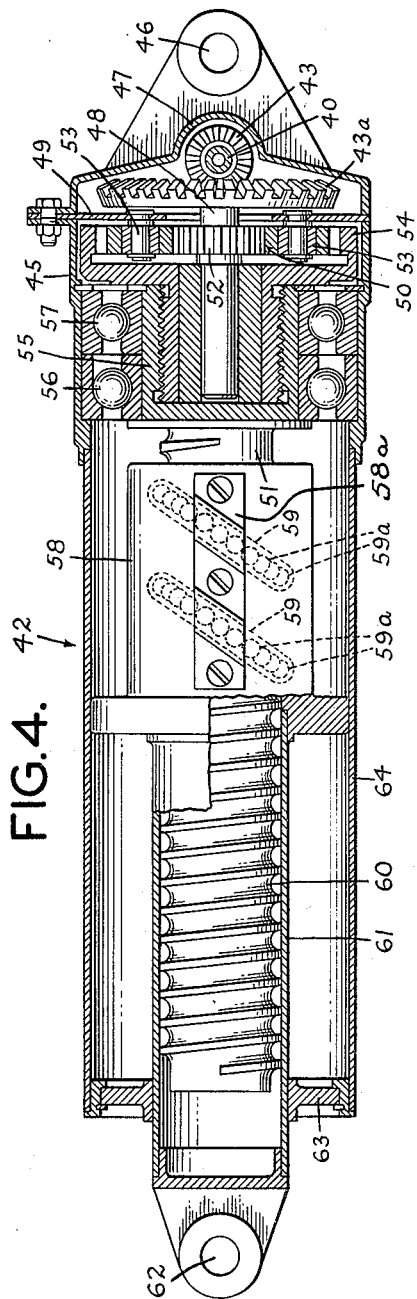
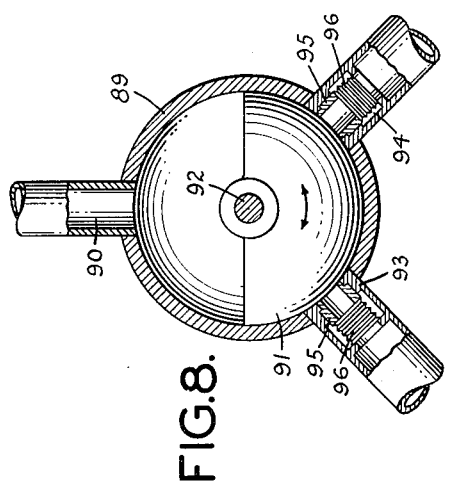
INVENTOR
EUGENE ELLIOT SHUBE
BY
HIS ATTORNEYS Aug. 23, 1960 E. E. SHUBE 2,949,891
PNEUMATICALLY ACTUATED MECHANICAL JACKS
Filed Aug. 16, 1956 3 Sheets-Sheet 3

INVENTOR
EUGENE ELLIOT SHUBE
BY
HIS ATTORNEYS

2,949,891
PNEUMATICALLY ACTUATED MECHANICAL JACKS

Eugene Elliot Shube, Elmont, N.Y., assignor to Fairchild Engine and Airplane Corporation, Hagerstown, Md., a corporation of Maryland Filed Aug. 16, 1956, Ser. No. 604,461

2 Claims. (Cl. 121—41)

This invention relates to improvements in actuator systems for imparting reciprocating or oscillating movement to machines or elements thereof such as the mechanism for varying the area of the exhaust nozzle of a gas turbine engine, systems for adjusting the wing flaps or landing gear of aircraft and the like. More particularly, the invention relates to an improved pneumatic actuator system of a type which is particularly suitable for use under high temperature conditions and particularly in apparatus where light weight with reliable operation are essential.

Heretofore, the majority of the systems for actuating landing flaps, for moving the elements of the exhaust nozzle of gas turbine engines to vary their area and for other similar purposes have included hydraulic systems involving the use of one or more hydraulic cylinders or jacks.

While the hydraulic systems devised heretofore are reliable under most circumstances, they have some disadvantages. For example, the fluids used in the hydraulic systems are flammable and their use in locations subjected to high temperature as, for example, in the exhaust nozzle area of aircraft engines present a hazard to air-frame safety and personnel.

Hydraulic fluid is heavy and the associated weight penalty is substantial.

It has also been found that hydraulic fluids have a tendency to crack at high temperatures and therefore their usefulness is limited to purposes where the temperatures do not exceed about 500° F. Moreover, hydraulic fluids do not withstand nuclear radiation effects and are unusable on power plants having to do with atomic generation of power.

A further disadvantage of systems using multiple hydraulic jacks or cylinders is the difficulty of synchronizing the movements of these jacks. In the conventional parallel arrangement of such hydraulic devices, during the movement of the jacks they can lag or lead by very substantial margins and thereby may cause an element driven by a plurality of such jacks to jam or be forced out of alignment. On the other hand, departures from the conventional parallel arrangement of hydraulic jacks or cylinders introduce cumbersome interconnections and additional possibilities of leakage which reduce the reliability of the system.

In accordance with the present invention, we have provided a pneumatic actuator system of a type which is light in weight, highly efficient and can be actuated by a relatively low pressure air source such as, for example, the air compressor of a gas turbine engine or the like. The use of pneumatic pressure for operating the system has numerous advantages particularly in situations where high temperatures are involved. First, air is noninflammable and thus is safe to use in high temperature areas. Air is light as compared to hydraulic fluid and it does not require an additional pump in systems where air under pressure is available. The use of air is not restricted at all by the temperatures surrounding the system and nuclear radiation has no effect on the system and the power transmitting medium.

The system according to the present invention is self-synchronizing inasmuch as it makes use of mechanical connections which can not lag or lead in an amount exceeding the tolerances required in devices for use in aircraft or in gas turbine nozzle adjustments. The system further has the advantage that it is independent of the operation of a hydraulic pressure source such as a pump or pump and accumulator inasmuch as it is operative as long as the engine of the aircraft is operating or other source of air under pressure is available.

More particularly, the present invention makes use of a screw type or lobe type of motor which is actuated by air under pressure to drive in either direction and through the rotation of the screws or lobes develop a torque or turning effect that can be transmitted by means of one or more screw jacks to the element being moved. When a plurality of screw jacks are required, as, for example, when several of them are disposed around the periphery of an element to be moved endwise in either direction, the torque for driving the screws can be transmitted by suitable flexible shafts which can be so designed that the twisting inherent in such shafts during transmission of the torque is maintained below the maximum permissible variation in such synchronized systems.

Operation of the screw type or lobe type of motor is controlled by means of a suitable valve which is responsive to a predetermined condition and can be shut off by the motion of the screw jacks, or elements driven thereby, by a suitable followup mechanism causing the valve to be closed when the desired movement is produced.

The system also is characterized by the provision of a novel type of exhaust valve for the air, whereby a large exhaust area is made available for exhaust gas from the motor regardless of its direction of rotation so that minimum back pressure and resistance to flow of the air through the motor are assured. The exhaust valve is characterized by sensitivity to the pressure of the air supplied to the motor so that it will move properly to exhaust the air from the motor in response to application of pneumatic pressure for driving the motor in a selected direction.

The system has the advantage that it may be manufactured within the weight limits imposed by aircraft design and yet it will furnish sufficient power to actuate even the more power-consuming elements of aircraft engines or aircraft without requiring a high pressure source of fluid for actuating the device.

For a better understanding of the present invention, reference may be had to the accompanying drawing in which;

Fig. 1 is a view in side elevation of a typical actuator system embodying the present invention with a portion of the casing thereof broken away to disclose details of the control valve and the motor of the system;

Fig. 2 is a view in section taken on line 2—2 of Fig. 1 with a portion of the casing of an actuating jack of the system shown broken away to disclose details of the drive mechanism for the jack;

Fig. 3 is a view in section taken on line 3—3 of Fig. 1;

Fig. 4 is a view in longitudinal cross section and partly broken away of a screw jack of a type used in the actuator system;

Figure 8 is a view in cross section of a modified form of control valve for the system.

Figure 7:
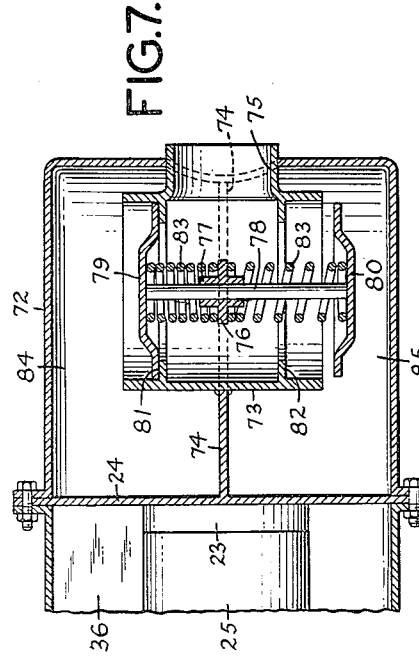
Fig. 7 is a view in cross section through the exhaust valve showing it displaced by pressure to vent the exhaust gas from the motor of the system.

The new actuator system will be described generally with reference to its use for moving the exhaust ring of a turbine but it will be understood that the system is applicable to substantially any apparatus in which a reciprocating movement or an oscillating movement of an element thereof is desirable. The system is particularly suitable to those usages in which the movement of a control element is to be followed directly or in ratio by an element actuated by the system.

As shown in Fig. 1 which discloses a typical assembly of the actuator system, the actuator includes a motor 10 of the lobe type and includes a pair of rotors 11 and 12 which intermesh and are disposed in a casing 13, of generally oval cross section. Air under pressure for driving the rotors 11 and 12 is supplied through the conduits or ports 14 and 15 which serve as the pressure or exhaust port of the system depending upon the desired direction of rotation of the motor. The provision of a lobe type, or a screw type, of motor in a system of the type disclosed herein is particularly desirable because of the low friction operation of the motor and its ability to operate throughout a wide range of speeds and yet develop a high torque at varying speeds.

Thus, a properly balanced lobe motor of the type disclosed is capable of operation at speeds in the order of 20,000 r.p.m. or higher and with relatively small lobes can develop 100 H.P. or even greater power, depending on speed and gas pressure, which is more than adequate for most of the purposes for which such actuator systems are used.

The motor is under the control of a selector valve 16 which, by means of suitable cooperating elements supplies air under pressure from a pressure source, such as, the compressor section of a gas turbine engine, selectively to either of the ports 14 and 15 through the passages 17 and 18 on opposite sides of a partition 19 within the outer casing or shell 20 of the valve 16.

Figure 5:
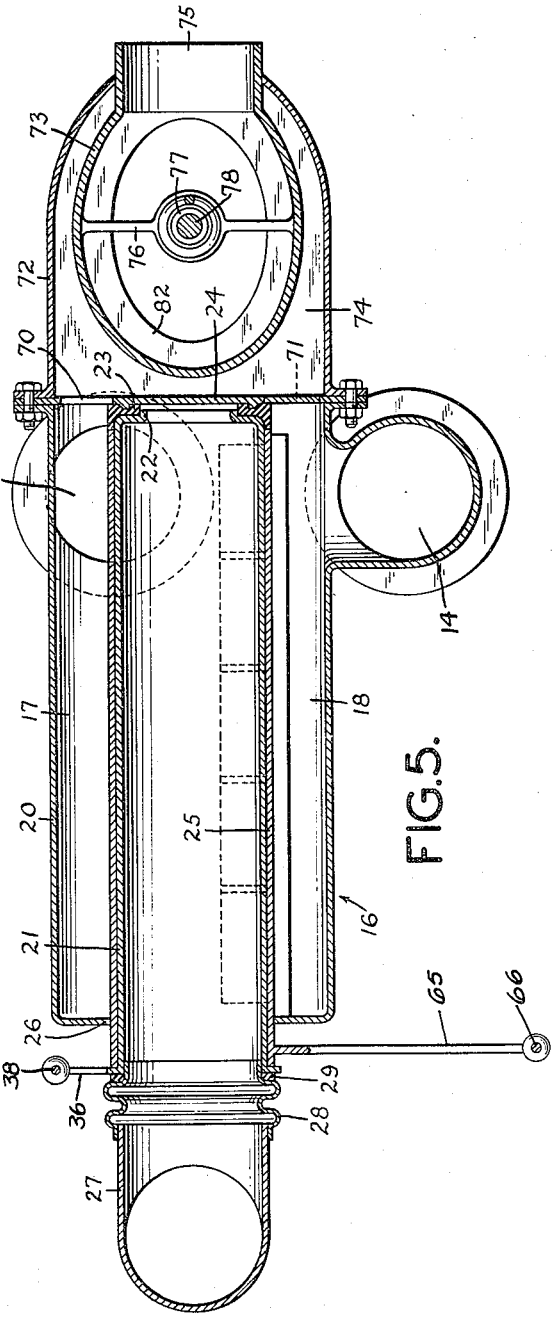
Fig. 5 is a view in cross section taken on line 5—5 of Fig. 1.

As shown in Figs. 1 and 5, the valve includes an inner sleeve member 21 which has its inner end provided with a reduced flange 22 which is rotatably received within a bearing ring 23 carried by a partition 24 extending across the right hand end of the casing 20. Rotatably mounted on the valve sleeve 21 is a followup sleeve 25 which is also rotatably mounted in an end flange 26 at the left hand end of the valve casing 20. Also as shown in Fig. 5, the interior of the sleeve 21 is connected to an inlet or pressure conduit 27 leading to the pressure source. An expansible bellows 28 and a rotatable seal 29 are interposed between the conduit 27 and the sleeve 21 to prevent leakage and permit the relative rotation of the latter. Referring back to Fig. 1, it will be seen that the inner sleeve 21 is provided with a port or series of ports 30 extending through it.

Angularly spaced ports or rows of ports 31 and 32 are provided in the outer sleeve valve member 25 and a thickened convexly-curved shell portion 33 is formed on the sleeve member 25 between the rows of ports for engaging the edge 35 of the partition 19 in sealing relation thereto. The passages 17 and 18 are further separated by sealing engagement of the sleeve 25 and a partition element 36 extending in from the opposite side of the casing 20. With the valve arrangement described, and the elements in the position shown in Fig. 1, gas admitted to the sleeve 21 is prevented from entering either passage 17 or 18 of the valve casing 20. When the inner valve element 21 is rocked, for example, clockwise by means of the linkage connection 37 to the lever on 38 on the sleeve valve 21, the port 30 will be moved into at least partial alignment with the ports 31 so that gas will flow from the sleeves into the passage 18 and to port 14 of the motor and will cause the rotors to rotate at a speed determined by the pressure of the gas and the load on the motor. Similarly, rotation of the selector valve sleeve 21 in a counter clockwise direction will bring the port 30 at least partially into alignment with the port 32 so that gas under pressure is admitted into the passage 17 and the motor port 15 to drive the motor in the opposite direction.

Inasmuch as the motor 10 has two shafts 40 and 41 supporting the rotors 11 and 12 respectively, it will be evident that there are four possible connections with the motor to drive a plurality of elements. Advantage can be taken of this fact to enable the synchronization of from one to four, or even more, jacks or the like such as the jack 42 disclosed in Figs. 1, 2 and 4 of the drawings.

As shown particularly in Figs. 2, 3 and 4, the shaft 40 may be extended from the motor casing 13 and provided with a bevel gear 43 for driving a ring gear 43a by means of which the jack is actuated. As shown in Figs. 2 and 3, the shaft 40 can also be provided with an extension 44 to which another jack or a flexible shaft (not shown) is connected for driving other mechanisms.

Referring now to Fig. 4, a typical jack may include a generally cylindrical casing portion 45 having an eye 46 on its right hand end to mount it either on the motor frame or on an aircraft element or the like. An enlarged casing section 47 is formed in the end of the casing to receive the shaft 40 and the bevel gear 43 thereon. Also enclosed within the section 47 of the casing is the ring gear 43a which is mounted on a shaft 48 extending through a partition plate 49 at the inner end of the casing section 47. A reduction gear 50 is interposed between the shaft 48 and the inner end of a screw shaft 51. The reduction gear can be of any type but as shown, it is of the planetary type and includes a sun gear 52 fixed to shaft 48, a plurality of planet pinions 53 mounted on the partition plate 49 and a ring gear 54 which is secured to the hub 55 of the screw shaft 51. Suitable antifriction bearings 56 and 57 mounted within the casing 45 support the hub 55 and shaft 51 for rotation. A nut 58 of the ball bearing type is mounted on the screw shaft 51. The nut contains helical grooves containing a plurality of rows of ball bearings 59a which circulate in grooves 60 in the screw shaft and in the grooves 59 in the nut member 58. A plate 58a is secured to the side of the nut by means of screws or in any other suitable way so that it can be removed for access to the grooves 59 and 60 to permit the balls to be inserted into these grooves or removed therefrom. A hollow sleeve 61 is secured to the left hand end of the nut and is provided with an eye 62 for connection with the element such as the exhaust sleeve to be moved. The screw shaft 51 is enclosed within the sleeve 61 and the latter slides in and is guided by the end closure 63 in the end of a cylindrical casing section 64 which encloses the nut and is joined at its right hand end to the casing portion 45. It will be appreciated that the nut is held against rotation by splines or in any other suitable way interposed between it and the casing so that rotation of the screw shaft 51 projects or retracts the sleeve 61 and the eye 62 thereon. The motion of the sleeve 61 or the element actuated by the jack is used to control the movement of the jack in response to the actuation of the sleeve valve 16. To that end, the outer sleeve 25 of the valve is provided with a lever arm 65 which is connected by suitable guided links 66 and 67 to an arm 68 fixed with respect to the eye and moving with it. The arrangement of the linkage is such and the operation of the motor 10 and the jack 42 are so related, that when the inner sleeve 21 is rotated in one direction to admit gas under pressure to the motor 10, the sleeve 25 will be moved by the jack to close or cover the opened or partially opened port 30 when the jack has been projected or retracted a related distance. When the sleeve valve 21 is rotated clockwise to uncover part or all of the port 30, the motor 10 will be set into operation by air admitted through the port 10 and will drive the jack in such a direction as to cause the outer sleeve 25 also to move in a clockwise direction, thereby closing the uncovered portion of the port 30.

Inasmuch as the port 30 is covered progressively as the jack is projected or retracted, the jack will move rapidly initially and then will slow down and come to a stop when the port 30 is completely covered.

Figure 6:
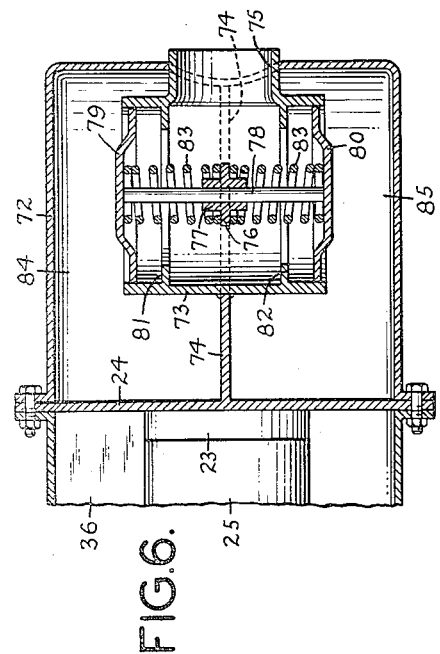
Fig. 6 is a view in cross section through the exhaust valve of the actuator system with the valve shown in neutral position.

The volume of air discharged from the motor 10 is quite large and to obtain maximum power at a given gas pressure, it is desirable to maintain a low back pressure in the system. A novel exhaust valve is included in the system by means of which the exhaust air can be discharged quickly and with a minimum of back pressure. The structure and arrangement of the exhaust valve and its relation to the selector valve 16 are best shown in Figs. 5, 6 and 7 of the drawing. The partition 24 has openings 70 and 71 therein, these openings being disposed on opposite sides of the partition 19 and communicating with passages 17 and 18, respectively. The openings 70 and 71 communicate with a valve casing 72 carried by the valve casing 20, the casing 72 having a shroud 73 which is supported by a partition 74 extending crosswise of the casing 72 as viewed in Figs. 6 and 7, and dividing it into two chambers which are separated except for communication through the shroud 73. The shroud 73 has a tubular extension 75 extending through the end of the casing 72 which serves as the vent to atmosphere from the interior of the shroud. A bar 76 extends across the shroud and is provided with a central sleeve 77 for receiving slidably a valve stem 78. Mounted on opposite ends of the valve stem 78 are valve heads 79 and 80 which cooperate with inwardly extending flanges or valve seats 81 and 82 in the shroud. Springs 83 are interposed between the crossbar 76 and each of the valve heads 79 and 80 to hold the valve normally in the neutral position shown in Fig. 6.

Inasmuch as the chamber 84 above the partition 74 communicates through the opening 70 with the passage 17 in the valve casing, and the chamber 85 communicates with the passage 18 through the opening 71, one of the compartments 84 or 85 is subjected to the pressure of the air admitted through the valve 16, while the other is subjected to pressure of the gas at the exhaust side of the motor 10. One of the chambers 84 or 85, therefore, will be at a higher pressure than the other, so that one of the valve heads 79 or 80 will be subjected to a higher pressure than the other and will be displaced by the differential pressure to move the valve communicating with the low pressure chamber out of the shroud 73 and close the valve communicating with the high pressure chamber. As shown in Fig. 7, high pressure in the chamber 84 forces the valve 79 against its seat 81, while the valve head 80 is displaced from its seat 82 and out of the shroud 73 to enable the exhaust air from the motor to escape freely through the vent 75.

Inasmuch as there is no direct connection between the selector valve 16 and the exhaust valve, the shape and size of the exhaust valve can be varied widely and thus can be made large, if desired, to enable the free flow of gas therethrough. Moreover, the shape of the exhaust valve heads and seats is relatively unimportant and they may be circular, oval, square, polygonal or any other desired shape.

As indicated above, not only can the jack 42 be driven by the motor, but other similar jacks can be driven by the motor through the medium of flexible shafts such as flexible stainless steel shafts when the system is used under high temperature or corrosive conditions.

Moreover, the control valve for the system is susceptible to modification and other types of valves than the sleeve valve described above can be used with equal facility, thus, as shown in Fig. 8 of the drawings, the sleeve valve described above can be replaced by a ball or globe type of valve including a spherical housing 89 having a gas inlet port 90 communicating with it and receiving a hemispherical ball valve 91 which is rotatably supported in the housing on a shaft 92.

Angularly related ports 93 and 94 are formed in the casing 89 and are connected to the valve casing on opposite sides of a partition corresponding to the joined partitions 36 and 19 so that the two ports are isolated from each other but can communicate with the exhaust valve extension as described above.

In order to effect a tight seal between the valve casing and the hemispherical valve 91, carbon bushings 95 may be mounted within the ends of the conduits or port portions 93 and 94 and may be pressed by means of bellows 96 against the face of the valve member 91. Thus a low friction seal is obtained between the valve and the bushings.

It will be understood that the casing can also be mounted for rotation and flexible connections made to the inlet port 90 and the system ports 93 and 94 to enable the casing 89 to be rotated by the linkage described above to provide a "follow-up" action in the system.

While the system described herein is of the followup type, it will be understood that the linkage between the jack and the control valve may be dispensed with and that the valves and the operation of the motor 10 can be controlled manually.

The system described above is adaptable to many uses and is especially suitable for the operation of reciprocating or oscillating elements of apparatus of many different kinds. The system may be of suitable size for large or small installations and it may be a unitary structure or elements thereof mounted at the points best suited for their operation and control. For example, the jacks may be remote from the motor if desired. From the foregoing, it will be apparent that the apparatus is susceptible to considerable modification and that the forms of the invention described above are illustrative.

I claim:

1. A pneumatically actuated jack comprising a reversible, rotary pneumatic motor including a pair of meshing rotors selectively rotatable in either direction and a pair of ports to supply gas under pressure to and exhaust gas from said motor, a selector valve for supplying gas under pressure selectively to either of said motor ports to drive the rotors in either direction of rotation, said selector valve including a pair of relatively rotatable sleeves having ports therein movable into and out of register to supply gas selectively to said motor ports, means for rotating one of said sleeves to register a port therein with a port in the other sleeve, means responsive to operation of said motor for rotating said other sleeve to move the registered ports out of register, a jack having a screw shaft connected to one of said rotors, an extensible and retractable element having a threaded connection with said shaft and movable axially thereof by rotation of said shaft, an exhaust valve having a valve casing with a pair of inlet ports and a discharge port to atmosphere, means connecting each of said inlet ports to a different motor port, a valve member movably mounted in said valve casing to connect said motor ports selectively to said discharge port and normally preventing flow of gas from either of said motor ports to atmosphere through said discharge port and means responsive to gas pressure supplied by said selector valve to one of said motor ports for moving said valve member to discharge the exhaust gas from the other motor port to atmosphere.

2. A pneumatic actuator system comprising a reversible rotary pneumatic motor having a casing containing at least one rotor and a pair of ports in said casing on opposite sides of said rotor for admission of gas under pressure and discharge of exhaust gas, a selector valve for supplying gas selectively to either of said ports, said selector valve having separate conduits communicating with said ports, a first sleeve member having angularly spaced ports therein, at least one of said ports communicating with one of said conduits and another port communicating with the other conduit, and a second sleeve member connected with said first sleeve member and having a port therein, said second sleeve member being rotatable relative to said first sleeve member to at least partially register the port in said second sleeve member with either of said ports in said first sleeve member to direct gas through one of said conduits to said motor, a connection between said first sleeve member and said motor for rotating said first sleeve member to move the ports therein out of register with the port in said second sleeve member, and an exhaust valve having separate chambers therein, each communicating with one of said conduits, and a valve member interposed between said chambers and responsive to differences in gas pressure in said chambers for exhausting gas from the chamber having the lower pressure therein to atmosphere.

References Cited in the file of this patent

UNITED STATES PATENTS

| | | |
|---|---|---|
| 620,281 | Cooper | Feb. 28, 1899 |
| 794,882 | Pagenhart | July 18, 1905 |
| 1,304,286 | Emden | May 20, 1919 |
| 2,064,051 | Allard | Dec. 15, 1936 |
| 2,140,095 | Theed | Dec. 13, 1938 |
| 2,243,656 | Shannon | May 27, 1941 |
| 2,456,211 | Nardone | Dec. 14, 1948 |
| 2,597,815 | Platts | May 20, 1952 |

FOREIGN PATENTS

| | | |
|---|---|---|
| 579,539 | France | Oct. 10, 1924 |